United States Patent [19]

Deen et al.

[11] Patent Number: 6,137,588
[45] Date of Patent: *Oct. 24, 2000

[54] DIGITAL REPRODUCTION CONTROL METHOD AND APPARATUS HAVING AUTONOMOUS AND COMMAND CONTROL MODES

[75] Inventors: Jurek N. Deen, Venlo; Eduardus J. W. van Vliembergen, Venlo; Johannes F. M. E. Geelen, Baarlo, all of Netherlands

[73] Assignee: Océ-Technologies B.V., Venlo, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/877,954

[22] Filed: Jun. 17, 1997

[30] Foreign Application Priority Data

Jun. 17, 1996 [NL] Netherlands ............................ 1003360

[51] Int. Cl.⁷ ............................... G06F 15/00; G06K 1/00
[52] U.S. Cl. ........................ 358/1.15; 358/1.13; 358/1.14; 358/401; 399/81; 399/85; 347/3
[58] Field of Search ................................ 395/111, 112, 395/113, 114, 117; 399/81, 82, 85, 87, 75, 1, 8; 358/443, 468, 401, 400, 474, 305, 1.1; 347/3; 700/2

[56] References Cited

U.S. PATENT DOCUMENTS

| | | | |
|---|---|---|---|
| 4,843,571 | 6/1989 | Notermans et al. | 395/117 |
| 4,992,884 | 2/1991 | Sakata | 358/401 |
| 5,119,472 | 6/1992 | Ogawa | 395/111 |
| 5,511,150 | 4/1996 | Beaudet et al. | 395/113 |
| 5,673,190 | 9/1997 | Kahleck et al. | 700/2 |
| 5,774,356 | 6/1998 | Hisatake et al. | 364/148.01 |

FOREIGN PATENT DOCUMENTS

| | | |
|---|---|---|
| 20291777 | 11/1988 | European Pat. Off. . |
| 1003360 | 8/1990 | European Pat. Off. . |
| 0499719A1 | 8/1992 | European Pat. Off. . |
| 2284319A | 5/1995 | European Pat. Off. . |
| 0689157A2 | 12/1995 | European Pat. Off. . |

*Primary Examiner*—Edward L. Coles
*Assistant Examiner*—David Rosenblum

[57] ABSTRACT

A combined digital reproduction apparatus suitable for making prints in response to actuation of keys on an operating panel (e.g. copies of documents scanned with a scanner) and making prints on its own initiative (prints in accordance with a digital print file received from a network). In this apparatus, a user present at the apparatus for a print order is given priority. The control process of the apparatus for this purpose executes any print orders arriving via the network only if it does not detect any signs indicative of the fact that a user is preparing or executing a reproduction process at the apparatus. Such signs may, for example, be in the form of actuation of a key on the operating panel or the actual execution of a copying order. If the control process detects such signs, it does not start the print orders received via the network. If the control process does not detect such signs, it announces the print order first for a predetermined time period, e.g. by a message on the operating panel display screen, before starting the actual printing process. On detecting activity by an operator at the apparatus, the printing process is canceled and the control process is again exclusively responsive to orders from the operating panel.

27 Claims, 7 Drawing Sheets

DIGITAL REPRODUCTION CONTROL METHOD AND APPARATUS HAVING AUTONOMOUS AND COMMAND CONTROL MODES

BACKGROUND OF THE INVENTION

1. Field of the Invention

The invention relates to an apparatus and method of controlling a digital reproduction apparatus adapted to print digital image data on image supports, such as sheets of paper. More particularly, the invention relates to an apparatus and method of controlling a digital reproduction apparatus having a command-controlled mode in which the apparatus starts a reproduction process in response to a start command given by an operator via an operating means located on or near the apparatus and an autonomous mode in which the apparatus starts a reproduction process on its own initiative, the autonomous mode being automatically set in response to a remote print order received from a digital environment.

2. Description of Related Art

Applicants' European patent application No. 0 689 157A discloses a conventional digital reproduction apparatus adapted, inter alia, to receive print orders via a network and print them directly. In addition, this conventional apparatus can make a copy of a document by scanning the document with a scanner and generating a print based on the digital image data generated from the scanning operation.

The conventional apparatus also can simply store a print order in a memory and delay printing until the print order has been selected by a user with the aid of the operating elements on the apparatus operating panel and a print command such as a start key. This operation will be hereinafter referred to as "postponed printing".

There are, therefore, orders which are started by a user by direct interaction with the machine (in this case copying and postponed print orders) and print orders which are given from a distance, e.g. from a workstation (PC).

For a user who has gone to the machine in order to start an order there using the keys, it is quite frustrating when a remotely-started (print) order starts just before he has a chance to start his order. Such a user then has to wait until this remote order is completed before making his copy. In practice, this frustrating and time-consuming situation occurs quite often, particularly on a machine in frequent use.

GB-A 2 284 319 discloses a copier/printer in which the execution of a print order is followed by a "printer hold time period" (PHTP) in which no new print order can be loaded in order to give a walk-up user who wants to make a copy the opportunity to do so without being hindered by a new, upcoming print order.

Although inserting a PHTP after execution of a print order may give some relief to a user who wishes to make a copy, it has several drawbacks as well. First, a waiting period during which the apparatus is exclusively available for copy orders is only meaningful when there is a copy user present. There is no reason to believe that such is the case just after a print job has been executed. Second, when there are no copy users present, the PHTPs slow down the apparatus unnecessarily especially when there are many print orders waiting. The position of the PHTP in the time schedule therefore seems to be ill-chosen.

In addition, GB '319 shows a print order loading message on the screen of the operating panel, during the loading of a print order, and an operator who is just preparing to execute a copy job may take precedence over the loading print order by using the interrupt facility of the apparatus. However, loading of a print order usually takes very little time and so the operator has to react quite fast to take precedence, assuming he even notices the print order loading message. Therefore, the operator may be taken by surprise by a remote print order. Also, working in an interrupt mode often has limited functionality and tends to rush the operator, which increases his stress level.

SUMMARY OF THE INVENTION

An object of the present invention is to provide an apparatus in which an operator who has walked up to the apparatus to execute a copy order or postponed print order is not disturbed by a sudden, upcoming remote print order. This object is met by the improvement, that, when the autonomous mode is set for carrying out a received print order, first a predetermined announcement time period is awaited, during which announcement time.

an announcement is given, in a manner which can be recognized by a user within the physical environment of the apparatus, that the remote print order is about to be executed, and in response to one or more specific physical interactions between an operator and the apparatus the apparatus is returned to the command-controlled mode, and the remote print order is actually performed only after expiry of the announcement time period.

As a result, when the apparatus switches itself into the autonomous mode for a remote print order, it remains, for a predetermined time, responsive to locally-commanded copying and postponed print orders. A user arriving at the machine at that time to make a copy knows that the machine will soon start printing a print order in the autonomous mode, but that he can, by quickly starting his copying order, postpone the print order and request priority for his own order. The machine will now deal with the walk-up operator's order first.

The announcement time period must be long enough for an operator to react to the announcement without hurrying him too much. Practical values for the announcement time period are from one 1 to 10 seconds. To ensure predictability and uniformity, the announcement time period may be a consistent (equal) time period for all print orders.

Particularly, the specific physical interactions that may be utilized to over-ride the impending print order include any machine-detectable interaction related to the execution of a reproduction process in the command-controlled mode. Examples of such interactions switching the apparatus to the command-controlled mode are: the pushing of a key on the operating panel, the placing of one or more original documents on an input tray or opening the door of the copy paper stock unit.

Also, there are some exempted physical interaction(s) that are excluded from causing a mode switch, because they are used for controlling events in the autonomous mode, which will be discussed later.

The announcement may be conveniently displayed on a display screen located on or near the machine operating panel, preferably with details concerning the identity of the impending print order.

Furthermore, when one or more of the above-defined physical interactions between an operator and the apparatus are detected, the apparatus switches to the command-controlled mode and is kept in the command-controlled mode for a predetermined first waiting time.

This offers the user at the machine the possibility of creating time for himself to start his order at leisure by some action, e.g. by actuating a key or by placing one or more documents in the machine feed tray. The autonomous mode cannot be entered by the apparatus during this first waiting time.

To increase efficiency, many workers will allow several copying and/or printing tasks to accumulate before walking over to the reproducing apparatus.

In the invention, when an operator action is detected (which action may be the depressing of a key on the operating panel, the placing of an original document on the input tray, or even a completed copy action), there is a good chance that the operator has accumulated several tasks and wants to execute another copy order or postponed print order. Therefore, the invention takes measures to prevent the situation in which incoming remote print orders disturb such an operator. These measures include starting a waiting time during which the apparatus is exclusively available for command-controlled orders. On the other hand, if there is no evidence of an operator being present, then remote print orders will be processed forthwith and no such time awaited.

Another embodiment of the apparatus according to the invention includes the feature of keeping the apparatus in the command-controlled mode for a predetermined second waiting time period after executing a reproduction process in the command-controlled mode. As a result, on completion of a copying order, the apparatus remains available for some time to make copies in the command-control mode.

Thus, if the user wishes to complete further copying orders the apparatus will not be usurped by a remote print order. During this second waiting time period, the apparatus cannot be switched to the autonomous mode. The second waiting time period may be equal to the first. A practical value for the waiting times would be between 30 seconds and 2 minutes.

Summarizing, during the announcement of a remote print order that is about to be performed, the apparatus is already in the autonomous mode perhaps busily processing the incoming or newly received remote print order, but remains for a predetermined time susceptible to signals which return the apparatus to the command-controlled mode. After interacting with the apparatus and for a waiting time thereafter, the apparatus is in the command-controlled mode and cannot switch over to the autonomous mode.

Even without the print order announcement mechanism during the announcement time period, the user at the machine can be advantaged by the waiting time mechanisms. In fact, this alternative is a special case of the announcement time, i.e. an announcement time having the value zero.

The announcement time for a print order may also differ according to what has taken place directly prior to that print order, e.g. it can be shorter between two successive print orders and longer directly after an action by a user at the machine to increase machine efficiency, but it can also always have the same value if machine response predictability is a priority.

If a large number of short print orders are to be printed consecutively without any interruption for a copying order, the production speed will be adversely affected by the announcement times described above. Consequently, another embodiment of the invention is that after executing a reproduction process in the autonomous mode, the announcement time of a reproduction process directly following thereafter in the autonomous mode has a third value if a predetermined cumulative number of prints built up during a preceding uninterrupted series of reproduction processes in the autonomous mode has not been exceeded, and has a fourth value if that is the case.

In particular, the third announcement time will be much shorter than the fourth, preferably even entirely zero. If there is a large number of short print orders in a queue, printing is interrupted only very briefly or not at all, until the predetermined number of prints has been reached, after which the user again has more time in which to interrupt the apparatus and receive priority for command-control mode orders.

Another embodiment is that in response to a start command given with the aid of operating means present on or near the apparatus during the announcement time, the announced print order is executed immediately. It may in fact be an operator's intention that his print order which has just been sent should be completed with priority. The invention offers such a user the option by giving him the same priority as other users who go to the machine in order to start an order there.

The invention has been defined hereinbefore in relation to an apparatus provided with both a connection unit to a digital environment (network) and a scanner for independent generation of digital image data. However, the invention is not limited thereto. The invention relates to any reproduction apparatus for making prints in accordance with digital image data and capable of operating either in a command-controlled mode or an autonomous mode. One example of this is an apparatus without a scanner but equipped for direct printing and the above-described postponed printing of print orders from a digital environment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

Figure 1:
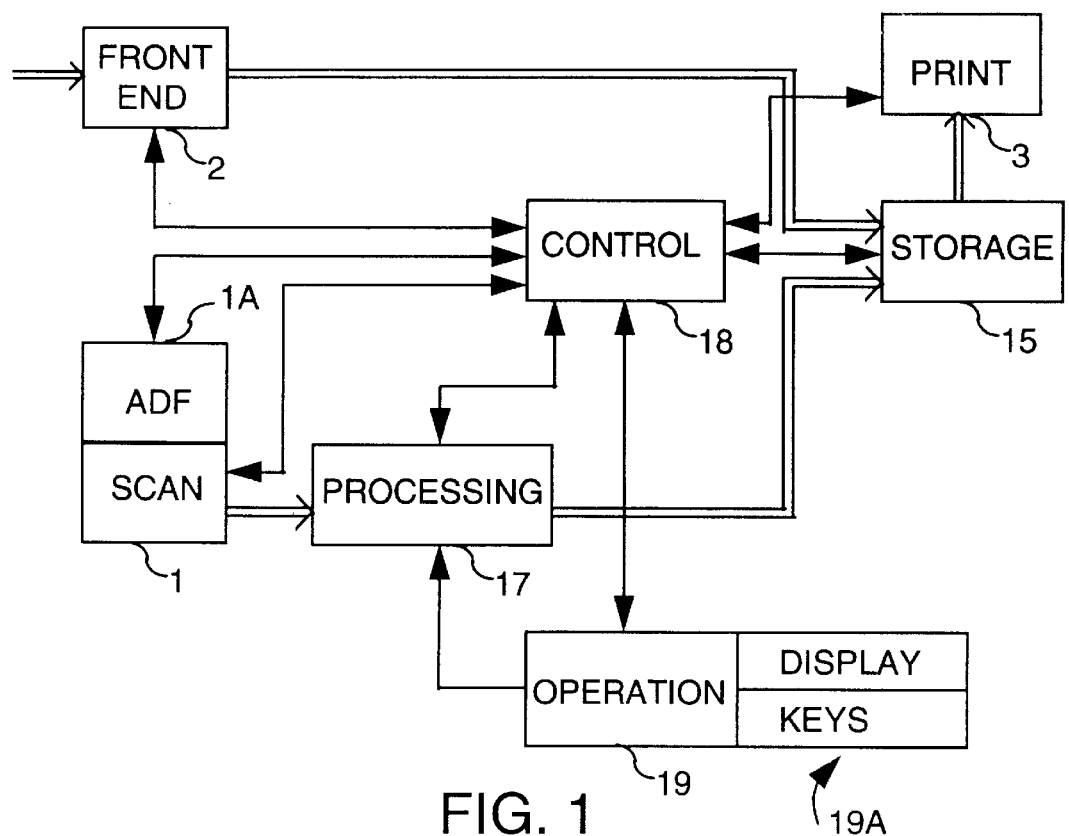
FIG. 1 is a diagram showing the general layout of an apparatus according to the invention.

FIG. 1 shows the general layout of an image reproduction apparatus according to the invention. This apparatus comprises a scanner 1 for opto-electrical scanning of a document and delivering digital image information corresponding thereto, an input unit 2 for image information from an external source, also known as the front-end, and a printing unit 3 for printing digital image information on a support material.

The scanner 1 is provided with an automatic feeder for documents for scanning (ADF) 1A, known per se, and is connected to a processing unit 17 which converts signals from the scanner into digital image data for the printing unit. The processing unit 17 is also connected to a storage unit 15 for intermediate storage of image information, which is in turn connected to the printing unit 3. The front-end 2 is also connected to the storage unit 15.

All the said elements are connected to a central control unit 18, which is also connected to an operating unit 19 provided with an operating panel 19A with keys and a display for use by an operator. The keys comprise at least one start key, a correction key, ten digit keys and a number of keys for setting copying functions, such as choice of copy format, enlargement and finishing.

The scanner 1 and the printing unit 3 are devices known per se and their construction does not form an essential part of the invention. These elements, therefore, are not described in greater detail here. A description of embodiments suitable for use in the apparatus according to the invention can be found, for example, in applicants' European Patent Application EP 0 689 157 already mentioned in the introduction.

Figure 2:
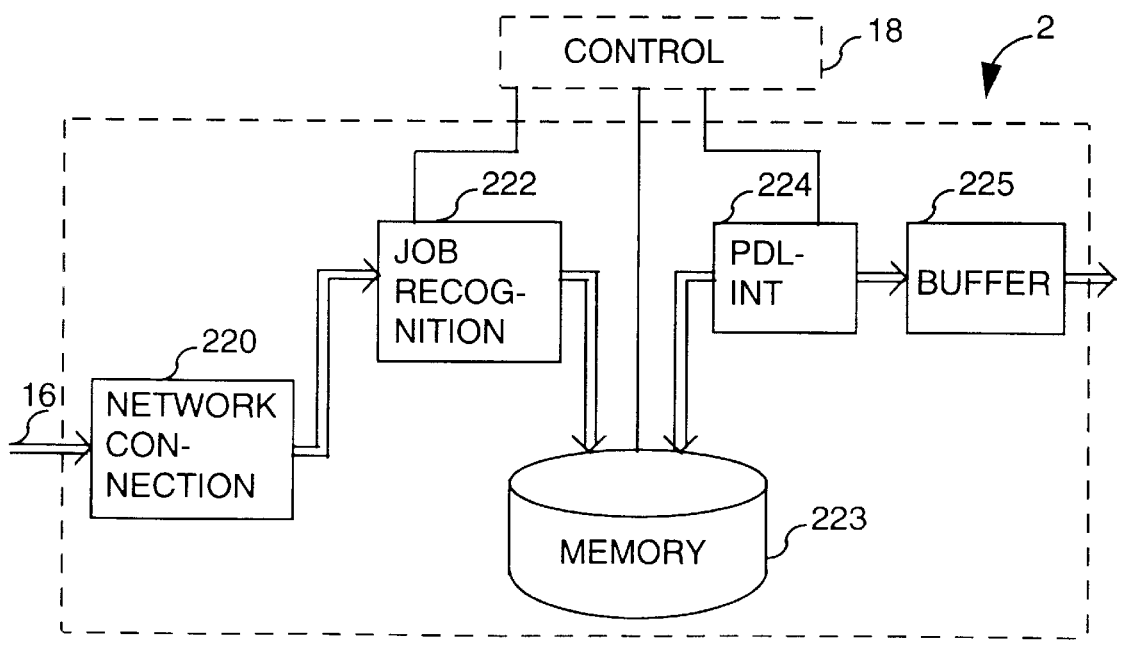
FIG. 2 is a diagram of the connection unit for use in the apparatus of FIG. 1.

The input unit 2 for digital image information from an external source, or the "front-end" is shown in FIG. 2. This unit is provided with a network connection unit 220, connected to an external network 16, to which, for example, a number of workstations can be coupled. These workstations can transmit data files in various generally used formats (page description languages such as PCL, PostScript, etc) via a network 16 for subsequent printing. The technique of networks and the transmission of data files thereover is general knowledge and will therefore not be explained here.

The connection unit 220 is connected to a job recognition module 222 which is in turn connected to a hard disk 223. The job recognition module 222 determines, for each data file supplied, the page description language (PDL) in which it is compiled, and extracts identification data contained therein. In network systems, data files transmitted are always provided with identification data. These data usually contain the name of the sender (owner) of the file and the name of the file itself. These data are extracted by the job recognition module 222.

The memory disc 223, which is intended for interim storage of a transmitted data file, is also connected to a PDL interpreter 224 for converting the data file coded in a page description language into a form suitable for processing by the printing unit 3. This processing is generally termed "rasterisation". The PDL interpreter 224 is connected via a buffer 225 to the storage unit 15 for interim storage. The job recognition module 222, the memory disk 223 and the PDL interpreter 224 are also each connected to the control unit 18.

A data file transmitted via the network 16 is intermediately stored on memory disk 223 by the front-end 2 and announced for printing at control unit 18. When the latter decides that the file is to be printed, it gives a command for this purpose to the PDL interpreter 224 for its rasterisation and transmission via buffer 225 to the storage unit 15. As soon as enough rasterised data have been stored therein to start printing by the printing unit 3 (e.g. sufficient for the first page for printing), the printing unit is started to make a print.

In the embodiment described here, print orders can have one of two forms, namely print orders to be printed without the intervention of an operator as soon as the printing unit is free, and printing orders which after receipt are simply stored and are printed only after selection and a starting command by an operator at the machine. The latter procedure is termed "postponed printing" in this specification. A print file is provided with an attribute which shows which of the above two categories it comes under.

A mechanism of use for postponed printing is described in applicants' European patent application EP 0 689 157. This document describes a combined copying/printing machine which either immediately prints received print files or stores them in a memory after first extracting the identity data therefrom. The identity data are entered in a list. A user whose print files are stored in this way can inspect the list of stored print files by means of the display on the operating panel of the apparatus and select one or more. By then operating the apparatus start key the operator gives the apparatus the command to print one or more selected print files.

In the following description, the term "copying" also includes the meaning "postponed printing". The common feature of both types of order is that they require the operation of keys on the apparatus operating panel.

The mechanism of copying and print management as implemented in the central control unit 18 will now be described in detail with reference to FIGS. 3 to 8.

The basic idea underlying the invention is that when an machine can be used both for making copies and postponed print orders (directly at the machine) and for the autonomous printing of print files (from a workstation), a user who takes the trouble to go to the machine must have priority for his order. The machine control process will therefore carry out autonomous print orders only if no user is present at the machine. In practice this means that the process always investigates whether there are signs to indicate that a user is engaged in carrying out an order or preparing the same at the machine. Such indications may, for example, be in the form of actuation of a key on the operating panel or the insertion of a document in the ADF feed tray. If the machine detects such indications, it will not start an incoming print order but will first wait a predetermined time. A practical value for this predetermined time would be between 30 seconds and 2 minutes. After expiry of that time the machine announces the print order on the display on the operating panel and again waits a certain predetermined time before actually starting the print order, so that a user who is present at the machine but who has not yet taken any action still has the chance of priority treatment. Moreover, if a user sees that a print order has been announced, he can have it printed with priority by actuating the machine start key. This second predetermined time would preferably be between 1 and 10 seconds. The mechanism for this is explained below.

Figure 3:
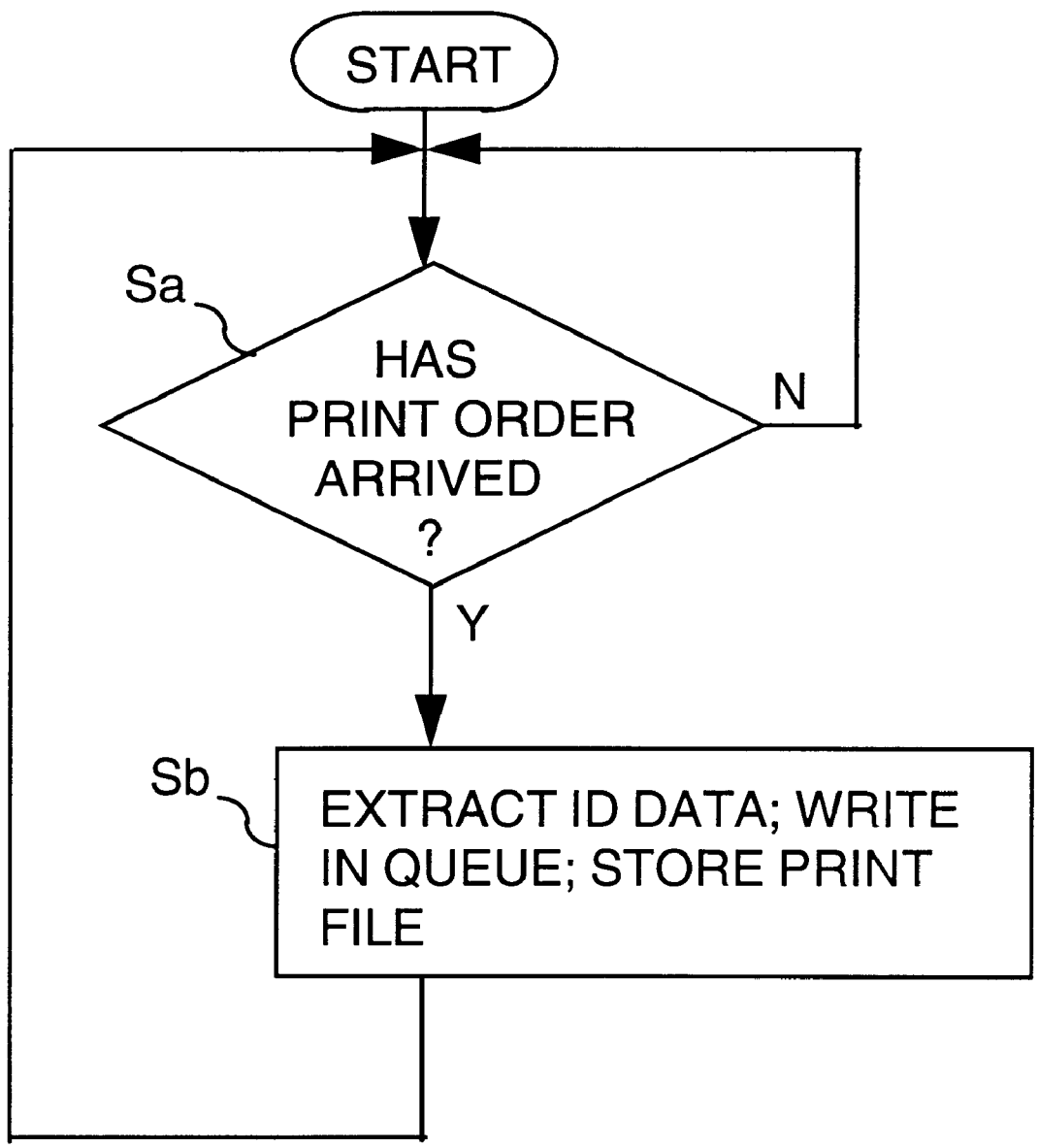
FIG. 3 is a flow diagram of a process for receiving print files.

FIG. 3 shows a process which is run to control the front-end 2 for receiving new print files from the network 16. This process contains a waiting loop which updates if a print order arrives. If this is the case, then the identity data (name of file owner and file name) are extracted from the received print file by recognition unit 222 and transmitted to the control unit 18, which enters the data in a queue and the file itself is stored on disk 223.

Figure 4:
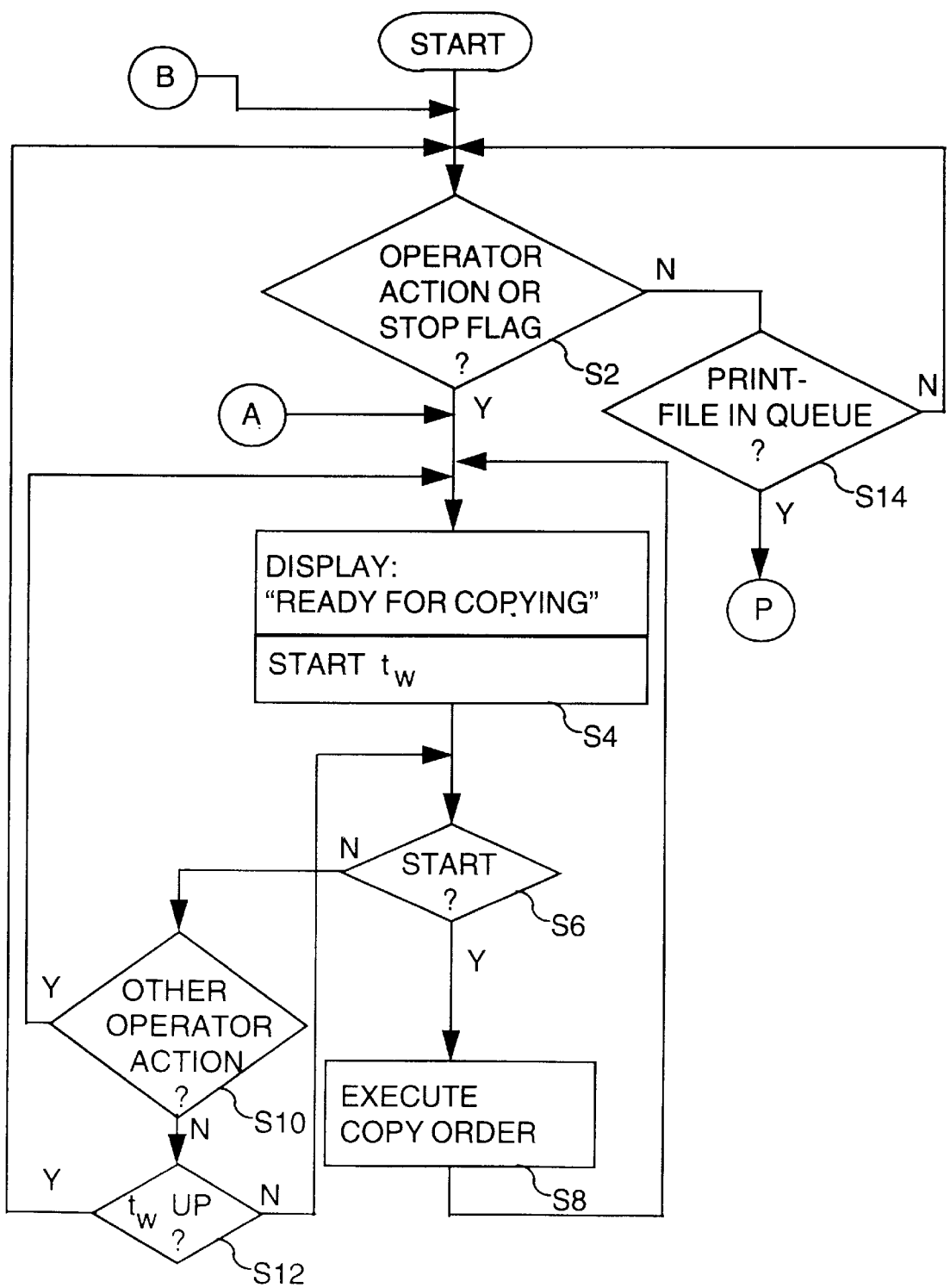
FIGS. 4 and 5 are flow diagrams of a main control processes according to the invention.
Figure 5:
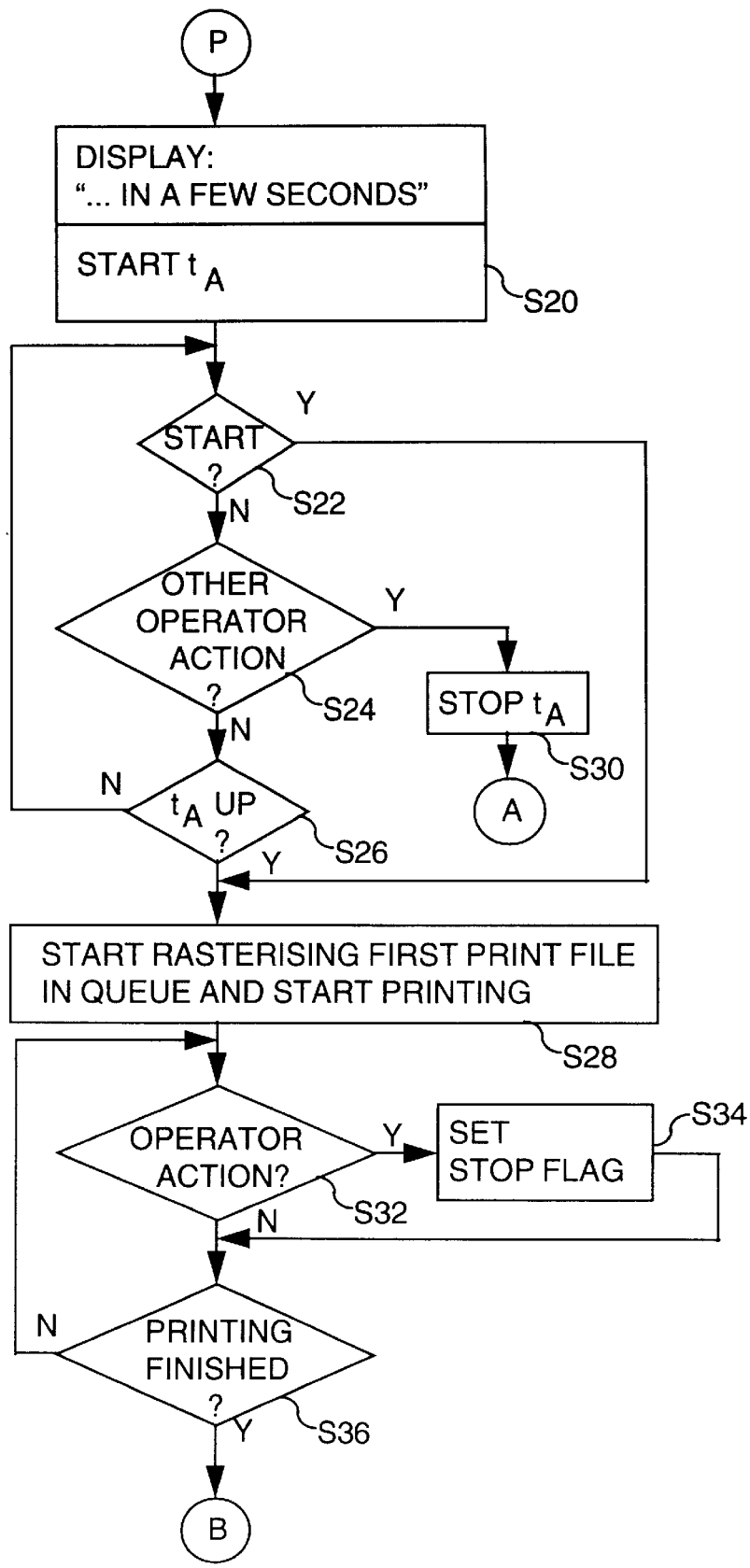

FIGS. 4 and 5 show the main process for controlling copying and print orders. By reference to signals from the operating panel and from sensors in a number of machine parts operable by the operator, such as the ADF feed tray, step S2 checks whether an operator is performing any action at the machine and also whether a stop flag has been applied (the latter will be explained in detail hereinafter). If so, then the control reserves the machine for a copying action and any print orders are simply stored. This is clear to the operator from the fact that the operating panel display shows the notice "Ready for copying". Internally, a counter for a predetermined waiting time (hereinafter referred to as the $t_W$ counter (this is a counter running autonomously from zero to $t_W$,) is started (step S4). The process then checks whether the start key has been actuated on the operating panel (S6) and if so a copying process is started comprising scanning one or more documents, processing the scanner signals to printer signals and printing the copies on the basis of the printer signals (in the case of postponed printing, this step involves selection by the operator of one of the stored print files, rasterisation thereof and printing of the prints) (S8). On completion of the copying process, the process returns to step S4, in which the $t_W$ counter is re-started.

If the start key had not been actuated in step S6, the process checks whether any other action was performed by an operator (S10). If so, the process returns to step S4 and re-starts the $t_W$ counter. The term "other action" by the operator denotes, for example, the following: entering settings for a copying order, e.g. the number of prints required. In addition to the above-described reaction to this, the settings entered are of course included in a control process for the copying order, such process not being described here.

If it is found in step S10 that no other action of an operator has taken place, then the position of the $t_W$ counter is detected (S12). If it has not yet reached its preprogrammed end value, the process returns to step S6. This ensures that the machine remains exclusively available for copying orders for a time $t_W$.

If step S12 shows that the $t_W$ counter has reached its end value without there having been any action by an operator, then the process returns to step S2 and everything re-starts.

In the above description, the waiting time mechanism has been explained using a limited model of the apparatus functionality, namely, copying being the only command-controlled action. In actual fact, the command-controlled mode includes both copying and postponed printing as described hereinbefore, the selection of one of these two functions being made by an operator in the "operator action" detected in step S2. This "operator action" may be either selection of a "print" mode using the keys on the operating panel 19A, in which case the postponed printing function is started, or any other action, including selection of a "copy" mode, in which case the copying function is started.

If the postponed printing function is started in this way, the operator is presented with a list of all his print orders received by the front end 2, that is, both print orders of the "postponed printing" type and print orders for immediate printing. The latter print orders are added to the list, because the operator may have walked up to the machine precisely for speeding up his print orders for immediate printing. The operator may now select any of the print orders in the list, may or may not change settings of the print process, such as single or double sided printing, and may start printing by pushing the start key. In this way, the postponed printing function provides a user with the opportunity to have a print order of the type for immediate printing printed immediately at his command, given at the operating panel.

The waiting time mechanism of the postponed printing function is completely analogous to the one of the copying function (steps S4, S6, S8, S10 and S12), and is therefore not included in the diagram of FIG. 4.

If it is found in step S2 that there has been no action by an operator, and that the stop flag has not been applied, then the process checks whether a print order has arrived by inspecting the queue for entered print files (S14). If there is no print order, then the process returns to step S2. If there is a print order, then the process deals with it in accordance with the diagram of FIG. 5.

The processing of a print order starts with starting a counter for the announcement time, hereinafter referred to as the: $t_A$ counter (this is a counter running autonomously from 0 to $t_A$), and the announcement of the first print order in the queue of the control unit 18 on the display of the operating panel by the notice "Print order starts in a few seconds", followed by the name of the owner of the print order and the name of the print file (S20). The message on the display also states that an operator can start the print order immediately by actuating the start key and can postpone the print order (so that he can himself first copy) by actuating the correction key. Any other action (actuation of a key other than the start key, insertion of documents in the ADF, even the opening of a door or flap), also results in the print order being postponed.

Step S22 then checks whether the start key has been actuated. If not, a check is made for any other action by a user at the machine (S24). If there is no such action, the position of the $t_A$ counter is detected (S26). If it has not yet arrived at its preprogrammed end value $t_A$, the process returns to step S22. If $t_A$ has been reached, the process starts the rasteriser 224 in step S28 in order to rasterise the first print file in the queue and write it to storage unit 15 via buffer 225. When sufficient rasterised data are present in the storage unit 15, the print unit 3 is started to print the image data on a sheet of paper. The print unit 3 can also be started when the rasterisation starts even though there are not sufficient image data available. Until such data are available the printing unit will run without printing. As a result the operator knows that the machine has noted his command. This is generally a good rule in digital copying or printing machines, in which the preprocessing of digital image data for printing occasionally takes some time. If the machine remains stationary after actuation of the start key, because there is only processing of image data first of all, the operator does not know whether the machine has recognized his order.

If it was found in step S22 that the start key had been actuated, then there was an immediate transition to step S28. If it is found in step S24 that some other action was carried out, then the preparation of the print order is discontinued. The announcement message is removed from the display, the $t_A$ counter is stopped and reset (S30) and the process skips to S4 (FIG. 4) to give the operator the opportunity of carrying out a copying order.

During the printing of a print order (started in step S28), the following message is displayed on the control panel display: "Busy with print order", followed by the name of the owner of the print order and the name of the print file. Furthermore, there is a continual check whether an operator has made his presence known by some action at the machine (S32). If this is the case, the process applies a stop flag to a specific place in the memory (S34), but does not interrupt the running print order. Since the stop flag has been applied, preparation for any new print order will not immediately be started after completion of the print order, and instead the machine first becomes available for a copying order. On completion of the print order (S36) the process returns to step S2, in which, inter alia, the stop flag is inspected.

Figure 6:
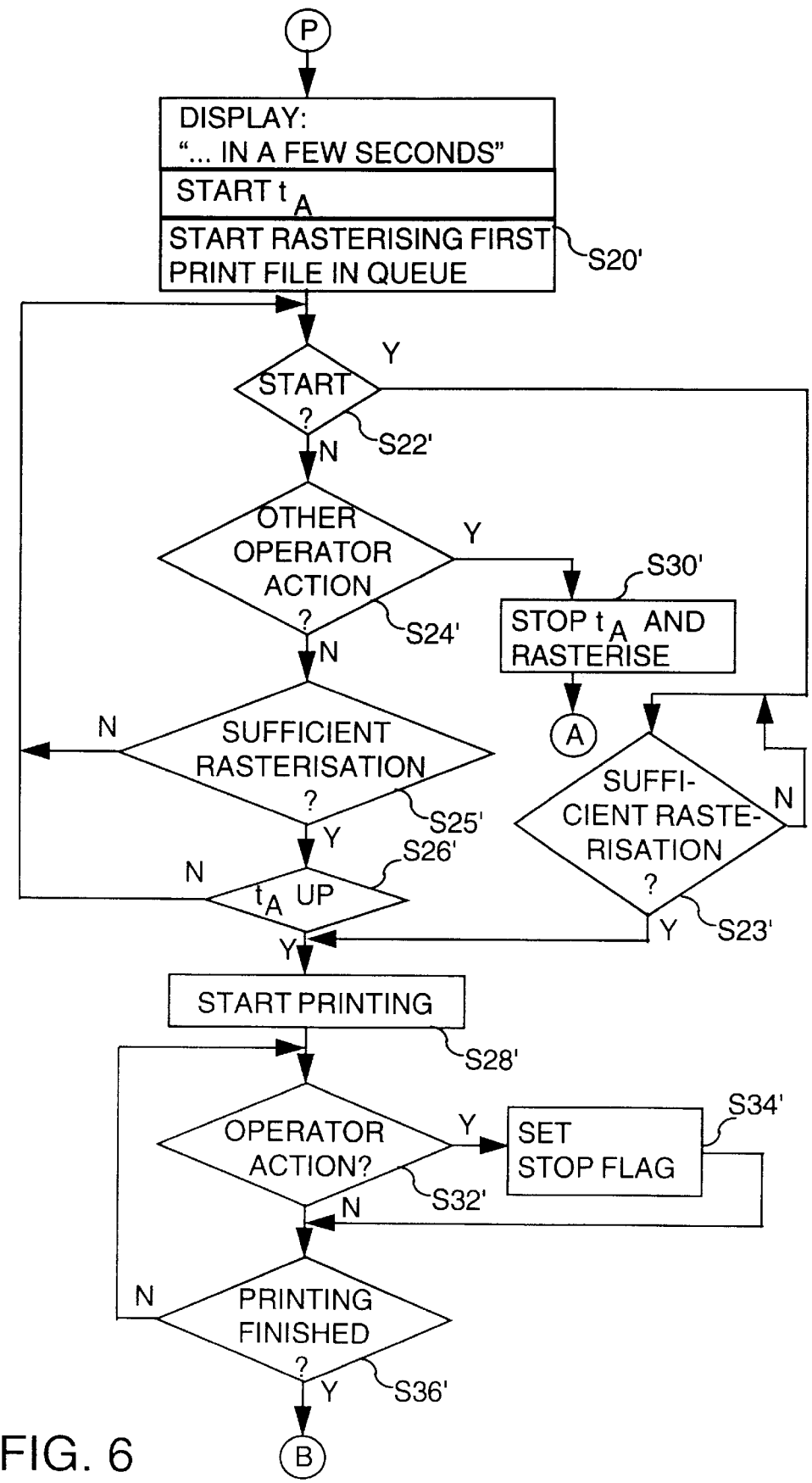
FIG. 6 is a flow diagram of an alternative control process according to the invention.

A second embodiment of the invention comprising an alternative treatment of a print order is shown in FIG. 6.

Here, rasterisation of a print file for printing and the writing of the rasterised image data to the storage unit 15 are already started at the start of the announcement time $t_A$, so that usually there will be sufficient image data for the print unit on completion thereof and hence printing can start immediately. If, during the announcement time, an operator interrupts the process in order to make one or more copies, then the image data already rasterised stay in the storage unit unless there is insufficient memory space available for the copying order. In that case, the image data already rasterised are erased from the storage unit and on completion of the interruption rasterisation must restart completely or partially. In the other case, rasterisation can proceed as usual when the data flow to the storage unit 15 for the copying order has been completed. Naturally printing of the print order does not start until expiry of the waiting time $t_W$. The machine can also be equipped with two separate memories, one for copying processes and one for print orders, so that in the event of interruption of a print order for a copying order the rasterised image data can be safely stored.

In FIG. 6, those steps which coincide with the steps in FIG. 5 are indicated by the same serial number and the prime sign. The sequence of the process according to this embodiment differs primarily from that of FIG. 5 by the addition of a step S25' between the steps S24' and S26' and a step S23' in the direct connection between S22' and S28'. The two added steps check whether there are sufficient rasterised image data available in storage unit 15 for printing to start. If this is not the case, the process skips from step S25' back to step S22', or else the process in step S23' waits until the rasterisation is completed.

Figure 7:
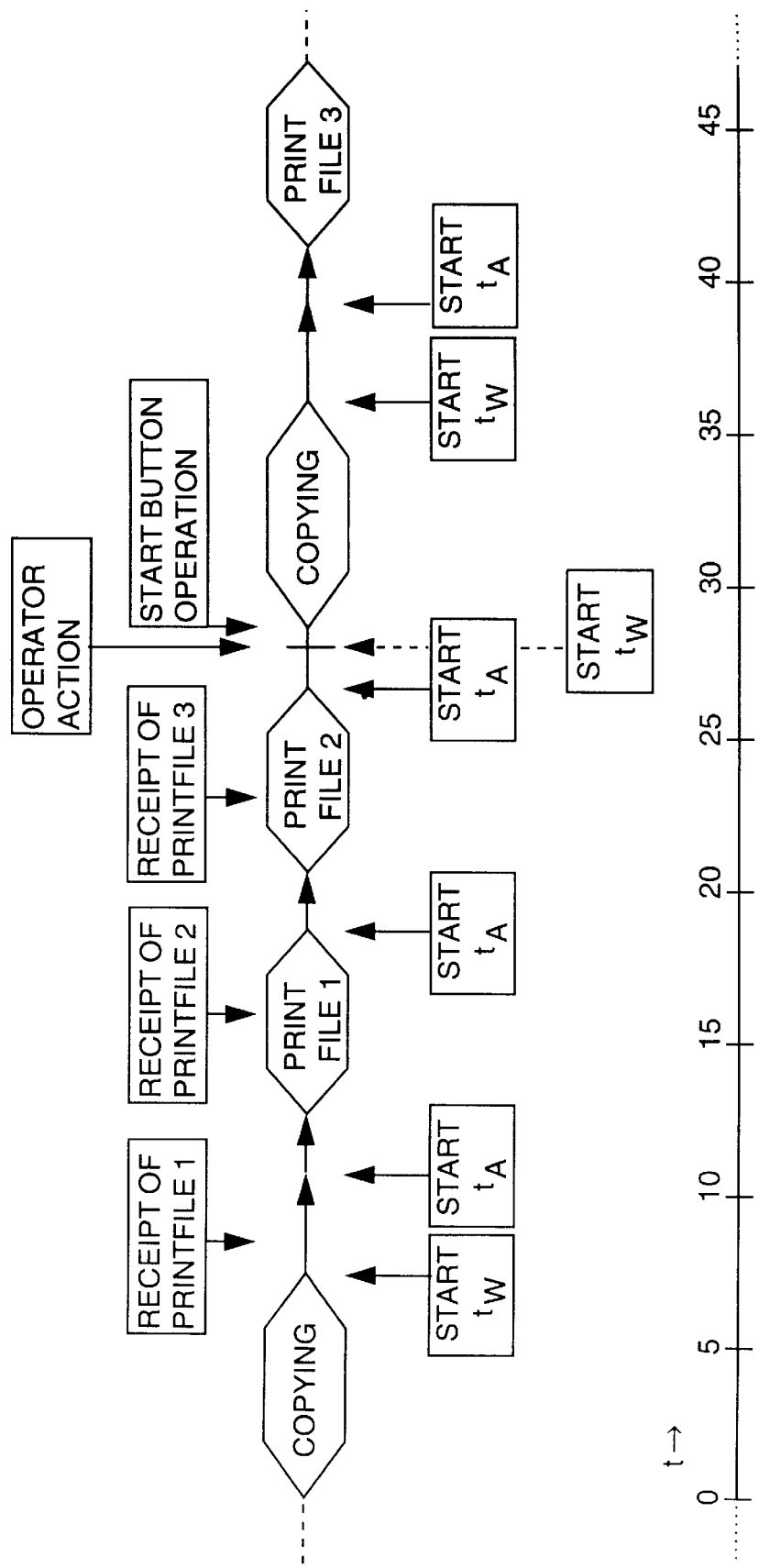
FIG. 7 is a timing diagram of the inventive process applied to an actual case.

FIG. 7 describes the procedure in the event of mixed use of the machine according to the invention as a printer and copying machine for an actual situation.

Along the bottom of the Figure a time scale is shown with arbitrary time units which will be used hereinafter to indicate consecutive events. For this example, the waiting time $t_W$ is set at three time units and the announcement time $t_A$ at two time units. The continuous line with blocks therein in the middle of the drawing shows the sequence of activities of the machine in the course of time. A block represents a copying or print action. In relation to the two alternative embodiments described above, a "Print" block denotes either rasterisation and printing of the rasterised image data (the first embodiment) or just printing, in which case rasterisation has already taken place in the announcement time $t_A$ (second embodiment). The latter is not shown separately in the drawing.

Let it be assumed that a copying order starts at a time t=0. This is completed at time t=8, whereafter the counter is started for the waiting time $t_W$. This runs to t=11. In the meantime, at time t=9 a print order has arrived in the front-end 2, which has reported it to central control unit 18 and has stored the associated print file (print file 1) on storage unit 223.

Since there is therefore a print order present at the end of $t_W$, the counter is now started for the announcement time $t_A$ and the announcement message with the name of the user and the print file is displayed on the display. Nothing has happened at the expiry of $t_A$ and hence the process now gives the front-end 2 the command to rasterise the print file 1 and to store the resulting image data in the storage unit 15, and gives the printing unit 3 the command to print the image data.

The printing unit finishes this at time t=19, but in the meantime a new print order has arrived at t=16 and has been stored by front-end 2 on disk 223 (print file 2). On the completion of the printing of print file 1, the counter for $t_A$ is then immediately re-started and the new print order is announced on the screen. On expiry of $t_A$ there has again been no action and hence the process orders the front-end 2 to rasterise print file 2 and to store the image data thus generated in the set memory 15, and orders the printing unit 3 to print the image data.

A new print order has arrived and been stored (at t=23) during the printing of print file 2 also, and on completion of the printing the counter for $t_A$ is re-started, but before this expires a perceptible action is carried out by a user at the machine at time t=28, e.g. the insertion of a stack of documents in the ADF feed tray. Consequently, at the same time, the counter for $t_A$ is stopped and the counter for the waiting time $t_W$ is started so that the machine is now exclusively available for a copying order for some time. The announcement of the print order is removed from the display and replaced by the message "ready for copying".

At the time t=29 the operator has made the required settings for his copying order and actuates the start key, whereupon the machine performs the copying order. This is finished at time t=36, after which the counter is started for the waiting time $t_W$ in order to give the operator the opportunity of giving any subsequent copying order. However, the operator is finished, removes his documents and copies from the trays and leaves the machine without any further action. As a result, $t_W$ runs undisturbedly and the process starts with the preparations for printing print file 3 by starting the counter for the announcement time $t_A$ and showing on the display the announcement message with the name of the user and the print file. On expiry of $t_A$, at t=41, the actual printing action is started.

Figure 8:
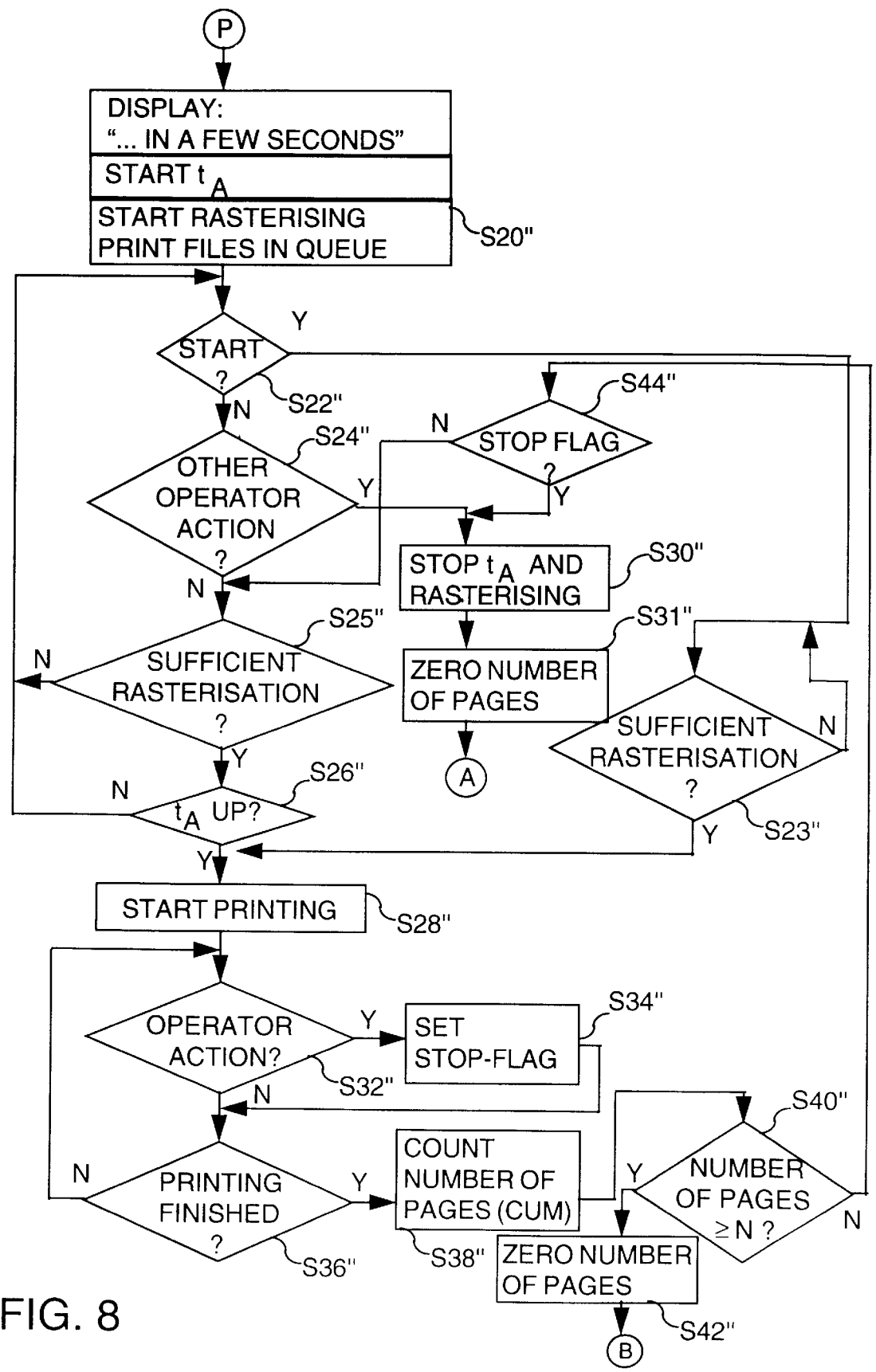
FIG. 8 is a flow diagram of an alternative control process according to the invention.

FIG. 8 shows a third embodiment of the invention. This embodiment is a variant of the above-described second embodiment shown in FIG. 6, and offers a further increase in printing speed, particularly if a number of small print orders are fed to the machine successively. In the said second embodiment, two print orders received shortly after one another are always printed with an interval $t_A$. If very small print orders are to be executed, the time required for their printing will be small with respect to the interim time $t_A$, and the total production time for all the print orders will be determined primarily by the intermediate times, so that the average print speed drops. This is greatly improved in the third embodiment described hereinafter. To this end, after the printing of a print file, the printing of the next print file is immediately started until the cumulative number of printed sheets of the series of print files exceeds a predetermined number, e.g. 30. Only in that latter case is an announcement intercalated with the interim time $t_A$.

Other criteria can also be used to effect the interruption for a new announcement, e.g. if a predetermined number of digital data are exceeded, or the interruption is to be possible if a print file of another owner has to be printed.

In FIG. 8, those steps which coincide with the steps in FIG. 6 are indicated by the same serial number and a double prime.

The rasterisation of print files (step S20") is now not restricted to the first print file in the queue, but continues until there are no more print files in the queue or there is an interruption to the process. While the rasterisation is in progress, the $t_A$ counter runs and the first print order is announced on the display. In the meantime, an operator can start the printing earlier by actuating the start key (S22"), so that printing starts as soon as the first print file has been sufficiently rasterised (S23" and S28"). Any other action by the operator (S24") causes rasterisation to be interrupted, the $t_A$ counter to be stopped and any built-up cumulative number of printed sheets is zeroed (S30" and S31"), whereafter the process returns to the copying mode.

When a print file has been rasterised (S25"), and the $t_A$-counter has also expired (S26"), the printing unit 2 is started for printing said print file (S28") and as long as this is not the case the process will continue to follow the operator's actions.

During printing the display shows the message "Busy printing print order", followed the name of the owner of the print order and the name of the print file, and also: "Press C for copying order". The process then continues to check operator's actions (S32") and applies a stop flag on recognition thereof.

On completion of a print order (S36"), the number of printed sheets is added to any total already built up (S38"), whereupon step S40" checks whether this results in the predetermined maximum number of pages (N) being exceeded. If this is the case, then the built-up cumulative number of printed sheets is returned to zero (S42") and the process skips back to step S2, so that an announcement is again made.

If the number N is not exceeded in step S40", a check is first made whether the stop flag has been applied as a result of an operator's action (S44"). If that is the case, the process skips to the copying mode via steps S30" and S31". If no stop flag has been applied, then in step S25" the process checks whether a following print file has already been rasterised and if so it proceeds to print the same. The $t_A$ counter had already expired, so that step S26" has no significance in this case.

In this way a number of small print orders can be processed rapidly, while still guaranteeing priority for a copying order.

As an addition to the above-described embodiments, the process can be extended in such manner that on receipt of a print order by the front-end 2 a message is shown on the operating panel display to indicate the arrival together with the extracted identity data of the received print order. In addition, the message states that this print order can be started immediately by actuating a specific key. After expiry of a predetermined time or by actuating another specific key the message disappears from the display. This is convenient for a user who wants to print a print file quickly, because after transmitting the print file he can immediately proceed to the machine and can start the print order there without having to await the waiting time or announcement time.

A special form of command-controlled mode is the priority printing of an ordinary print order when a queue of print orders has arisen as a result of a large inflow of print orders. These print orders are included in the queue in order of arrival. In known networking systems it is possible to inspect the queue. This possibility is also incorporated in the apparatus according to the invention, in which inspection takes place by means of the display on the operating panel. Using the keys on the operating panel a user can now select a print order from the queue. According to the principle of the invention, this action of the machine is also dealt with as a copying or postponed print order, i.e. in accordance with steps S2 to S12 (with of course an appropriate text being shown in step S4).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of controlling a digital reproduction apparatus that prints digital image data on an image support either in a command-controlled mode in which the digital reproduction apparatus starts a reproduction process in response to a start command given by an operator with the aid of operating means located on or near the apparatus, or an autonomous mode in which the digital reproduction apparatus starts a reproduction process on its own initiative automatically in response to receiving a remote print order from a digital environment, comprising the steps of:

announcing that a received print order is about to be reproduced in the autonomous mode, waiting for an announcement time period having a predetermined length when the digital reproduction apparatus is about to reproduce a received print order in the autonomous mode, switching to the command-control mode in response to a physical interaction between the operator and the digital reproduction apparatus during the announcement time period, executing the received print order in the autonomous mode after expiry of the announcement time period if said switching step is not activated by physical interactions between the operator and the digital reproduction apparatus during the announcement time period.

2. The method according to claim 1, wherein the physical interactions detected in said switching step include any machine-detectable interaction related to the execution of a reproduction process in the command-controlled mode, except one or more exempted physical interactions.

3. The method according to claim 1, said announcing step further including displaying an announcement message on a display screen provided on the apparatus.

4. The method according to claim 1, said announcing step further including displaying an announcement message identifying the received print order that is about to be reproduced.

5. The method according to claim 1, wherein if said switching step switches to the command-control mode in response to one or more physical interactions between the operator and the digital reproduction apparatus during the announcement time period, the method further comprises the step of:

keeping the apparatus in the command-controlled mode for a first predetermined waiting time period after said switching step is activated by said physical interaction between the operator and the apparatus.

6. The method according to claim 5, wherein the physical interactions detected in said switching step include any machine-detectable interaction related to the execution of a reproduction process in the command-controlled mode, except one or more exempted physical interactions.

7. The method according to claim 5, further comprising the step of not permitting a switch to the autonomous mode upon receipt of a print order during the first predetermined waiting time period.

8. The method according to claim 5, further comprising the step of keeping the apparatus in the command-controlled mode for a predetermined second waiting time period upon completion of a reproduction process in the command-controlled mode.

9. A method according to claim 8, further comprising the step of not permitting a switch to the autonomous mode upon receipt of a print order during the second predetermined waiting time period.

10. The method according to claim 8, wherein the announcement time period has a first value if it directly follows expiry of the first or second predetermined waiting time period, and has a second value if it follows directly after the execution of a reproduction process in the autonomous mode.

11. The method according to claim 1, wherein after executing a reproduction process in the autonomous mode, the announcement time period of an autonomous mode reproduction process directly following thereafter has a third value if a number of prints accumulated during a preceding uninterrupted series of reproduction processes in the autonomous mode does not exceed a predetermined cumulative number of prints, and has a fourth value if the number of prints does exceed the predetermined cumulative number.

12. The method according to claim 1, further comprising the step of immediately executing the announced print order in response to a start command given by the operator via the operating means during the announcement time period.

13. The method according to claim 1, wherein the reproduction process in the command-controlled mode includes a copying process that generates digital image data with a scanner belonging to the apparatus and prints the generated digital image data on an image support.

14. The method according to claim 1, wherein the reproduction process in the command-controlled mode includes a postponed printing process for print orders received from the digital environment, wherein execution of a postponed print order can be started only in response to the operator actuating the operating means located on or near the apparatus.

15. The method according to claim 1, wherein the reproduction process in the command-controlled mode includes the steps of selecting a print order from a queue of print orders received from the digital environment and executing the selected print order.

16. An apparatus for reproducing images on image supports, comprising:
   a generator for generating digital image information including a connection unit for receiving and processing digital information from a digital environment;
   a printing unit for printing an image on an image support in accordance with the digital image information generated by said generator;
   an operating unit provided with operating means located on or near the apparatus for permitting an operator to interact with the apparatus; and
   a control unit connected to the connection unit, said printer unit and said operating unit, for controlling the apparatus in either a command-controlled mode in which the control unit controls the apparatus to start a reproduction process in response to a start command given by the operator via said operating means, or an autonomous mode in which the control unit controls the apparatus to start a reproduction process automatically in response to receiving a remote print order from the digital environment via the connection unit;
   said control unit including detecting means for detecting a physical interaction between the operator and the apparatus;
   said control unit further including an announcement time period counter counting an announcement time period having a predetermined length and announcement means for announcing that a remote print order is about to be reproduced in the autonomous mode;
   said control unit further including means for checking whether a remote print order has been received by the connection unit from the digital environment and, in response thereto, automatically setting the autonomous mode;
   said control unit starting the announcement time counter and activating the means for announcing a print order when the autonomous mode is set for the execution of a remote print order received by the connection unit;
   said control unit responding, during the announcement time period, to said detecting means detecting the physical interaction between an operator and the apparatus by switching to the command-controlled mode;
   said control unit starting a reproduction process in the autonomous mode for executing the remote print order only after expiry of the announcement time period in the announcement time period counter.

17. The apparatus according to claim 16, wherein the physical interactions detected by said detecting means include any machine-detectable interaction related to the execution of a reproduction process in the command-controlled mode, except one or more exempted physical interactions.

18. The apparatus according to claim 16, wherein the announcement means includes a display screen located near the operating unit and adapted to display an announcement message.

19. The apparatus according to claim 16, wherein the announcement means identifies the remote print order upon announcement thereof.

20. The apparatus according to claim 16, said control unit further including a first waiting time period counter counting a predetermined first waiting time period,
   wherein in response to said detecting means detecting a physical interaction between the operator and the apparatus, said control unit starts the first waiting time period counter and keeps the apparatus in the command-control mode for the duration of the predetermined first waiting time period.

21. The apparatus according to claim 20, wherein the physical interactions detected by said detecting means include any machine-detectable interaction related to the execution of a reproduction process in the command-controlled mode, except one or more exempted physical interactions.

22. The apparatus according to claim 20, wherein if a remote print order is received by the connection unit while the apparatus is in the command-control mode, said control unit does not permit a switch to the autonomous mode until the first waiting time period counter elapses the predetermined first waiting time period.

23. The apparatus according to claim 20, said control unit further including a second waiting time counter counting a predetermined second waiting time period,
   wherein upon completion of a reproduction process in the command-controlled mode, said control unit activates the second waiting time counter and keeps the apparatus in the command-controlled mode for the duration of the predetermined second waiting time period.

24. The apparatus according to claim 23, wherein if a print order is received by the connection unit when either the first or second waiting time counters are elapsing the predetermined first or second waiting time periods, said control unit does not permit a switch to the autonomous mode.

25. The apparatus according to claim 23, wherein the announcement time period has a first value if it directly follows expiry of the first or second predetermined waiting time period, and has a second value if it follows directly after the execution of a reproduction process in the autonomous mode.

26. Apparatus according to claim 16, said control unit further including a print counter counting a number of prints accumulated during execution of print orders in the autonomous mode, wherein after executing a reproduction process in the autonomous mode, the announcement time period of an autonomous mode reproduction process directly following thereafter has a third value if a number of prints accumulated by said print counter during a preceding uninterrupted series of reproduction processes in the autonomous mode does not exceed a predetermined cumulative number of prints, and has a fourth value if the number of prints does exceed the predetermined cumulative number.

27. The apparatus according to claim 26, said control unit immediately executing the announced print order in response to a start command given by the operator via said operating means during the announcement time period.

* * * * *